United States Patent [19]
Pugh et al.

[11] 3,862,000
[45] Jan. 21, 1975

[54] COOLANT MIXING VANES

[75] Inventors: Ralph A. Pugh; George A. Sofer, both of Richland; Charles E. Leach, Benton City, all of Wash.

[73] Assignee: Exxon Nuclear Company, Inc., Richmond, Wash.

[22] Filed: Aug. 31, 1972

[21] Appl. No.: 285,209

[52] U.S. Cl. ............... 176/78, 176/76, 176/81
[51] Int. Cl. ............... G21c 3/34, G21c 15/24
[58] Field of Search ............... 176/76, 78, 73–75, 176/81, 61

[56] References Cited
UNITED STATES PATENTS

| | | | |
|---|---|---|---|
| 3,379,619 | 4/1968 | Andrews et al. | 176/76 X |
| 3,395,077 | 7/1968 | Tong et al. | 176/78 |
| 3,625,822 | 12/1971 | Mantle | 176/78 X |
| 3,663,367 | 5/1972 | Calvin | 176/78 |
| 3,749,640 | 9/1973 | Israel | 176/78 |

FOREIGN PATENTS OR APPLICATIONS

| | | | |
|---|---|---|---|
| 1,439,362 | 4/1969 | Germany | 176/78 |

*Primary Examiner*—Carl D. Quarforth
*Assistant Examiner*—Roger S. Gaither
*Attorney, Agent, or Firm*—F. Donald Paris; F. Donald Parks

[57] ABSTRACT

Mixing vanes are so arranged on certain sections of nuclear reactor spacer grid to provide a vortex flow of coolant about each intersection of the fuel assemblies in the reactor. This flow produces a mass transfer of coolant between adjacent assemblies and between regions within each assembly.

9 Claims, 4 Drawing Figures

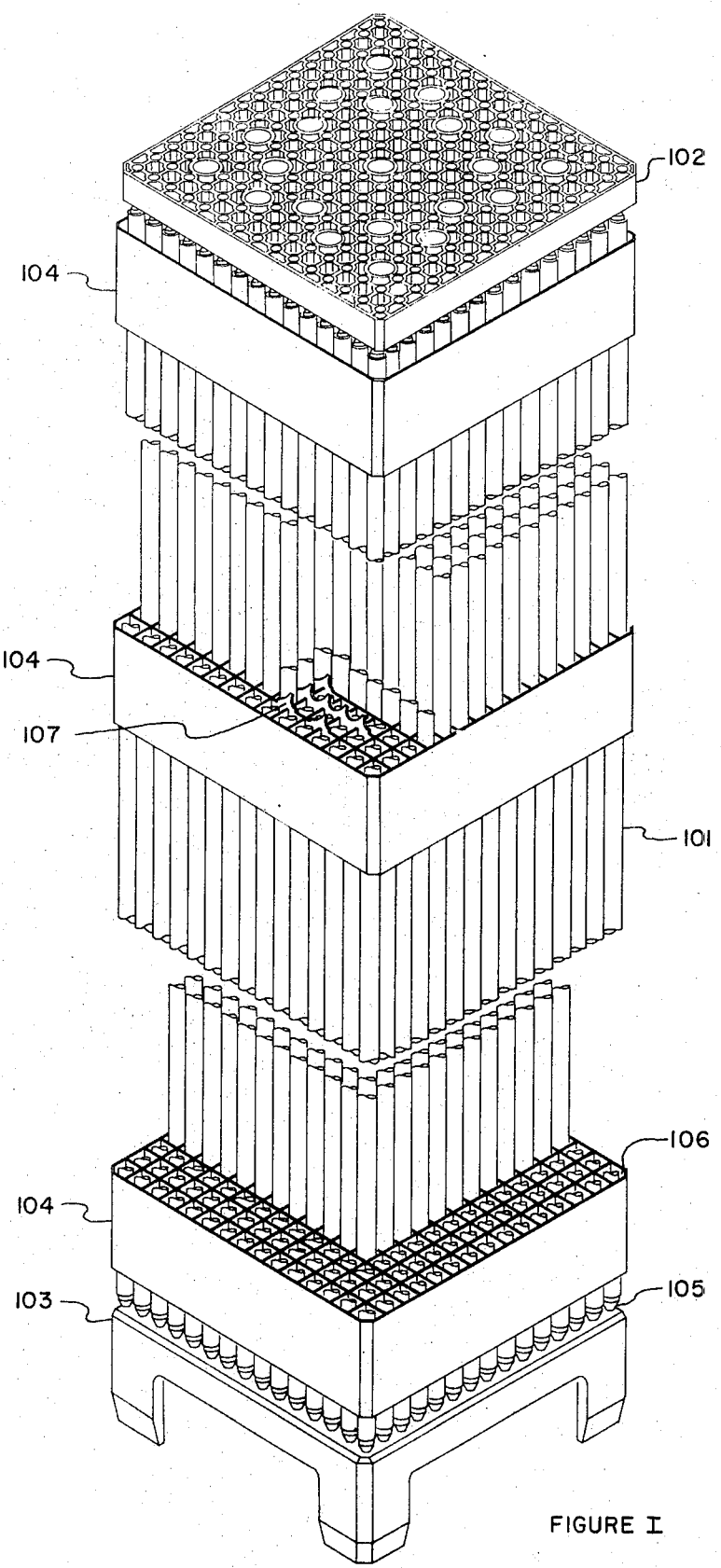
FIGURE I

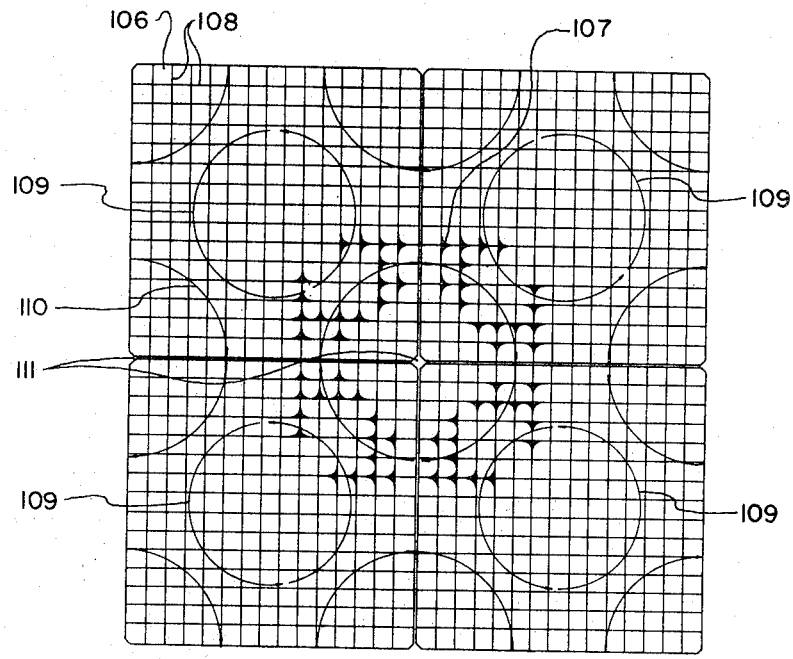
FIGURE III
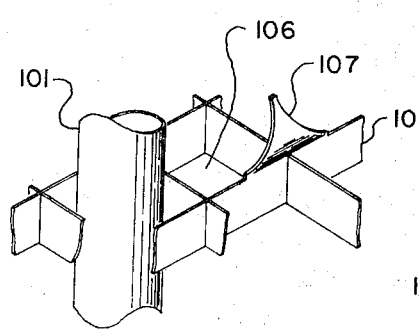
FIGURE II
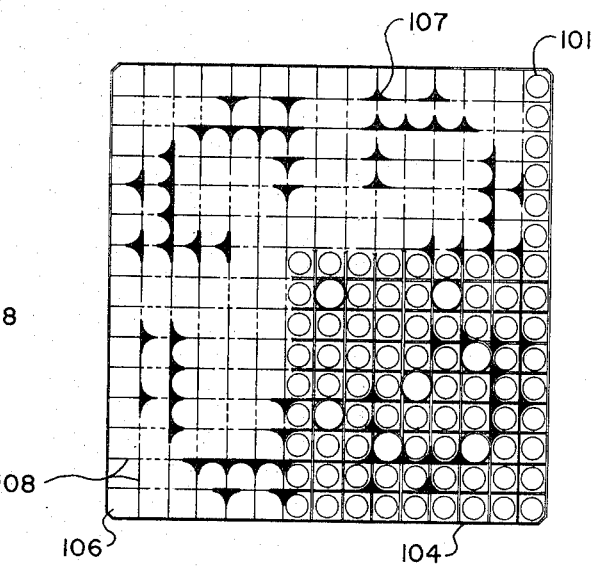
FIGURE IV

COOLANT MIXING VANES

BACKGROUND OF THE INVENTION

This invention relates broadly to nuclear reactors and systems, and more particularly to fuel element spacer assemblies having vortex generating vanes arranged for improved coolant mixing.

One problem associated with many reactor core designs, particularly light pressurized water-type nuclear reactors, is the development of hot channels resulting from geometrical tolerances, local fuel element variations and other factors controlling heat concentration in the core. To overcome this problem, various fuel assemblies have been designed to effect a coolant interchange from hot core regions to cooler core regions, and vice versa, as the coolant is flowing through the coolant flow channels. Typical designs are described in U.S. Pat. No. 3,281,327 by J. Webb et al. and entitled "Nuclear Fuel assemblies", U.S. Pat. No. 3,344,855 by P. J. Clark and entitled "Heat Exchange Assembly Including Guide Vane Structure Therein," U.S. Pat. No. 3,379,619 by H. N. Andrews et al. and entitled "Fuel Assembly for Nuclear Reactors," and U.S. Pat. No. 3,395,077 by Long Sun Tong et al. and entitled "Fuel Assembly for Nuclear Reactors." While these prior art designs increase the interchange of coolant from hot core regions to cooler core regions, and vice versa, the amount of interchange is not as great as desired. In particular, most of the coolant interchange is only between adjacent coolant flow sub-channels whose temperature gradient is not large. Furthermore, many of the coolant flow patterns established by the prior art designs are difficult to maintain. Therefore, hot channels still occur in these prior art designs, resulting in less heat removal from the reactor core.

SUMMARY OF THE INVENTION

It is an object of this invention to overcome the above prior art problems and disadvantages. In particular it is an object of this invention to provide a reactor core design that will establish an easily maintainable coolant flow pattern between adjacent fuel assemblies. A further object of this invention is to provide a reactor core design which will result in a lower temperature gradient between all regions of the reactor core. A still further object is to provide a reactor core design which will efficiently remove the heat being generated in the reactor core.

These and other objects and advantages of this invention will become apparent from the ensuing description of the invention.

Accordingly, a fuel assembly is provided with coolant deflecting vanes cantilevered from the fuel assembly spacers into the coolant flow channels at positions to effect a vortex-shaped coolant flow pattern having a diameter extending over three or more fuel element spacer openings.

In another embodiment of the invention a reactor core is provided with coolant deflecting vanes cantilevered from the fuel assembly spacers into the coolant flow channels within the fuel assemblies at positions to effect more than one vortex-shaped coolant flow pattern having a diameter extending over three or more fuel element spacer openings wherein the pattern of flow in any one vortex is not in a lateral direction counter to an adjacent vortex pattern of coolant flow. More particularly, the coolant deflecting vanes are positioned on at least some of the spacer openings in a symmetrical pattern about the reactor core region where three or more fuel assemblies adjoin.

BRIEF DESCRIPTION OF THE DRAWINGS

FIG. 1 is an isometric view, partly in section, of a fuel assembly which utilizes a preferred placement of the mixing vanes according to the present invention.

FIG. 2 is an isometric view of a preferred coolant deflecting means design.

FIG. 3 is a cross-sectional view of four adjacent fuel assemblies showing one preferred placement of the mixing vanes and the resultant coolant flow patterns.

FIG. 4 is a cross-sectional view illustrating a preferred positioning of the deflecting means on the fuel element spacer of a fuel assembly.

PREFERRRED EMBODIMENTS OF THE INVENTION

In a typical reactor core the nuclear fuel is placed in fuel elements which are held in parallel array by a combination of grid spacers, upper and lower tie plates and other connecting members, all of which comprise a fuel assembly. These assemblies are then grouped together to form the reactor core.

A typical reactor core particularly applicable to this invention is the light pressurized water type. FIG. 1 illustrates a typical fuel assembly that would be employed in such a reactor core.

The fuel assembly shown in FIG. 1 comprises a parallel array of long, thin tubular fuel elements 101 secured and held in place by upper and lower tie plates 102 and 103, respectively, and by fuel element spacers 104. The fuel elements are fitted with lower end caps 105 which may fit into matching openings (not shown) found in the lower tie plate 103. The fuel elements then fit through openings 106 formed in the grid spacers 104 to position them in parallel.

The coolant flows upward through holes in the lower tie plate and between the fuel elements. As the coolant flows upward through the fuel assembly it removes the heat generated in the fuel assembly. Because the amount of heat generated in all parts of the fuel assembly and in adjacent fuel assemblies is not uniform, heat removal efficiency is not uniform for all parts of the individual fuel assembly and for adjacent fuel assemblies. More particularly, the peripheral areas of the fuel assembly are generally the coolest, and the central area is generally hotter than the upper and lower fuel assembly regions. To obtain uniform heat removal, it is necessary to distribute the coolant uniformly over adjacent fuel assemblies. For this reason, it is desirable to position coolant deflecting means 107 in the fuel assembly in order to provide a better circulation of coolant from the cool regions to the hotter region and vice versa.

As shown in FIG. 2, the coolant deflecting means in the form of substantially triangular-shaped vanes 107 are mounted on the interlaced straps 108 of the spacer 104 and cantilevered above the openings 106 formed by the interlaced straps 108. In this manner coolant flowing through openings 106 contacts the deflecting means 107 and is caused to move laterally as it passes through the assembly. This results in an interchange of coolant between different regions of the assembly.

In a preferred embodiment the deflecting means 107 are mounted at the intersection of the interlaced straps 108 and over two adjacent openings 106 with the apex of the vane 107 overlying and aligned with the strap 108. In one specific design the deflecting means has a gradual concave curvature extending from the straps 108 and two arcuate side portions extending from its base connected to the straps 108 and terminating at the apex of the vane.

In prior designs the coolant deflecting means have been positioned on the fuel element spacers to effect either a spiral motion within a single opening or at best between adjacent openings or adjacent subchannels, or a longitudinal zigzag motion between adjacent openings, or opposing flow in adjacent streams. The coolant flow patterns have not been as effective as desired because they are difficult to establish and even harder to maintain. Further, while these types of patterns do effect a somewhat more uniform temperature distribution within a fuel assembly there is not nearly enough cross coolant circulation between adjacent fuel assemblies.

In the present invention these difficulties are overcome by the placement of the deflecting means in specific locations to develop vortex-shaped coolant flow patterns that span at least three openings, and more preferably have a diameter of about one-half the length and width of the fuel assembly.

Referring now to FIG. 3, a preferred arrangement of the coolant deflecting means in a grouping of four adjacent fuel assemblies is seen. Basically, the coolant deflecting means 107 are mounted on the intersecting straps 108 which form the openings 106 and are positioned such that the vortex-shaped flow patterns 109, denoted by the arrows, are developed. These flow patterns center about the middle of each fuel element spacer cross-section. In this manner the coolant passing through the hot center (i.e., high power generation region) of each fuel assembly is forced toward the cooler perimeter (i.e., lower power generation region). In addition to the vortex-shaped flow pattern 109 developed within each fuel assembly, the coolant deflecting means are positioned and arranged to coact with other coolant deflecting means in the adjacent fuel assemblies to develop the vortex-shaped flow patterns 110 that extend across fuel assembly boundaries into adjacent fuel assemblies and center about the point 111 where the four adjacent assemblies are grouped. Typically greater temperature variations exist between adjacent fuel assemblies. The foregoing arrangement of the vanes permits temperature averaging by causing a component of coolant flow across a given fuel assembly to mix with flow components of adjacent assemblies. Coolant at lower temperatures are brought into higher temperature regions, thus producing a temperature averaging effect. This lowers the coolant temperature in the hottest channels and permits operation at higher average temperatures and efficiencies without exceeding local component temperature limits and with greater thermal safety margins caused by inherent uncertainties. Various vortex velocity distributions are obtainable depending upon the pattern of the vanes.

As shown in a preferred embodiment of FIG. 3 the mixing vanes are placed symmetrically about diagonals across the cross-section of the adjacent fuel assemblies in such a manner that the narrow tip or apex of the vanes points in the desired direction of coolant flow. This specific symmetrical placement about only some of said openings insures that the desired flow patterns will be established. It should be recognized, however, that such symmetry may not be desirable, feasible or necessary in some designs while still obtaining substantially the same results, and also, in some designs to effect pressure drop compatability with the fuel it may be necessary to include vanes in most or all of the spacer openings. By increasing the diameter of the flow patterns not only can the flow patterns be more easily maintained, but better cross-circulation of the coolant throughout the reactor is accomplished.

The mixing vanes are also mounted about the openings so that adjacent flow patterns do not run counter to one another and thus cause breakdown of the patterns, but instead cooperate with one another in maintaining the flow patterns established.

In a preferred embodiment, the triangular-shaped turning or mixing vanes 107 extend downstream of the coolant flow and are included relative to the plane of the spacer, with the tips of the vanes being disposed at an obtuse angle relative to the same plane. The vanes may be generally described as disposed at an acute angle relative to the direction of primary reactor coolant flow. To obtain the desired rotational flow, preferably in the form of free vortices, the vanes are grouped in quadrants with those vanes in the same quadrant having the same attitude, i.e., clockwise or counterclockwise depending on the flow direction desired, about the corner of the particular fuel assembly taken as the center. The attitude is the same in all quadrants. Also, the omission of these vanes in the highest power region (where the fuel rods are located between two adjacent control rod guide tubes) avoids restriction of the primary flow of coolant, thus achieving maximum cooling in this critical region. However, it is recognized that in some designs the presence of such vanes may be required.

Turning now to FIG. 4, a preferred positioning of the deflecting means 107 on the interlacing straps 108 of spacer 104 is shown. The deflecting means 107 are mounted at the intersection of straps 108 and cantilevered above two adjacent openings 106 in the direction of flow patterns 110 and 111. More preferably, the deflecting means are mounted only on some of the intersections and are positioned symmetrically about a diagonal across the square cross-section of spacer 104. In a more preferred embodiment the deflecting means will be symmetrical about either diagonal across the square cross-section of spacer 104.

There has been illustrated and described an arrangement of vanes which promotes circular but irrotational (i.e., circulation is zero) flow between adjacent fuel assemblies to take advantage of the wide variation in power generation rates in adjacent assemblies by reducing the enthalpy of coolant in the highest power assemblies. Thus, the fluid momentum which preserves the vortex is commenced and the vortex persists much longer than might otherwise be expected. The arrangement also permits achieving the desired vortices independent of assembly orientation. It should be understood, however, that the constructions and arrangements herein illustrated and described are intended to be representative of only a preferred embodiment and that certain changes readily may be made therein without departing from the clear teachings and scope of the present invention. Accordingly, reference should be made to the following appended claims in determining the full and true scope of this invention.

Having thus described and illustrated our invention, what we claim as new, novel, useful and unobvious and desire by U.S. Letters Patent is:

1. In a liquid-cooled nuclear reactor core having a plurality of adjacent fuel assemblies which are polygonal in cross-section and have adjacent corners defining an intersection of said fuel assemblies, each of said fuel assemblies having a plurality of elongated fuel elements in parallel array held in position by upper and lower securing means and by fuel element spacers, each of said spacers having intersecting straps forming openings through which the elements longitudinally extend and coolant can flow in a longitudinal direction, and adjacent ones of said fuel elements at the intersections of said straps forming subchannels for the flow of coolant therethrough, wherein the improvement comprises:

each of said fuel assemblies including a plurality of coolant flow deflecting means mounted on at least some of the intersections of said straps of said spacers, a first plurality of said flow deflecting means arranged concentrically relative to said intersection of said adjacent corners of said adjacent fuel assemblies and oriented in the same circumferential direction for deflecting at least a portion of the longitudinal coolant flow transversely within each fuel assembly for producing a first concentric unidirectional substantially unrestricted vortex flow pattern of the coolant relative to the intersection of said adjacent corners of said adjacent fuel assemblies which transfers substantially all of the coolant deflected by said first plurality of flow deflecting means in one of said fuel assemblies to a single adjacent one of said fuel assemblies and a second plurality of flow deflecting means arranged concentrically relative to the center of each of said fuel assemblies and oriented in the same circumferential direction for producing therein a second unidirectional substantially unrestricted vortex flow pattern of coolant relative to said center for effecting temperature averaging between high and low temperature regions of said adjacent fuel assemblies and within each assembly, the orientation of said first and second plurality of flow deflecting means being such that adjacent ones of the coolant flow vortices cooperate with each other to maintain established flow patterns.

2. In a reactor core according to claim 1 wherein said first concentric flow pattern of coolant has a maximum radius which is greater than at least three of said openings formed by said intersecting straps.

3. In a reactor core according to claim 1 wherein said coolant flow deflecting means extend over only preselected ones of said openings and said first plurality of deflecting means are symmetrically arranged about the intersection formed by said adjacent corners of said fuel assemblies.

4. In the reactor core according to claim 1 wherein the concentric arrangement of said first plurality of coolant flow deflecting means has a minimum radius of at least one of said openings formed by said intersecting straps.

5. In a reactor core according to claim 1 wherein said first plurality of coolant flow deflecting means are oriented for producing said first vortex flow pattern in a clockwise direction.

6. In a reactor core according to claim 1 wherein said second plurality of coolant flow deflecting means are oriented for producing said second vortex flow pattern in a counterclockwise direction.

7. In a reactor core according to claim 1 wherein said fuel assemblies each has a generally square horizontal cross-section and said first and second plurality of coolant flow deflecting means are mounted at only preselected ones of said intersections in symmetrical fashion relative to a diagonal of said square horizontal cross-section.

8. In a reactor core according to claim 7 wherein said first and second plurality of coolant flow deflecting means are mounted symmetrically in each quadrant formed by intersecting diagonals of said square cross-section of each of said fuel assemblies.

9. In a reactor core according to claim 1 including four adjacent fuel assemblies, each of said fuel assemblies comprising a quadrant and said coolant deflecting means in each of said quadrants being mounted symmetrically relative to said coolant deflecting means in an adjacent one of said fuel assemblies.

* * * * *